July 14, 1953     T. J. HOLLENKAMP     2,645,532
GROUSER

Filed June 14, 1945     2 Sheets-Sheet 1

INVENTOR.
THEODORE J. HOLLENKAMP
BY
J. H. Church & H. E. Thibodeau
ATTORNEYS

July 14, 1953 T. J. HOLLENKAMP 2,645,532
GROUSER

Filed June 14, 1945 2 Sheets-Sheet 2

INVENTOR.
THEODORE J. HOLLENKAMP
BY
J. H. Church & H. E. Thibodeau
ATTORNEYS

Patented July 14, 1953

2,645,532

UNITED STATES PATENT OFFICE 2,645,532

GROUSER

Theodore J. Hollenkamp, Detroit, Mich.

Application June 14, 1945, Serial No. 599,499

5 Claims. (Cl. 305—10)

(Granted under Title 35, U. S. Code (1952), sec. 266)

The invention described herein may be manufactured and used by or for the Government for governmental purposes, without the payment to me of any royalty thereon.

This invention relates generally to tracks and more particularly to a grouser for the tracks of a track laying vehicle.

Under certain operating conditions the flotation and traction provided by the standard track of a track laying vehicle, such as a military combat tank, are insufficient for the most efficient operation. The load carried by the vehicle and the type of terrain over which it is operating are factors which are variable and which materially affect its operation.

It is, therefore, a principal object of the present invention to provide a grouser which may be attached to the tracks of a track laying vehicle and which will increase the flotation and traction thereof. This is accomplished in the present invention by providing a transversely extending grouser positioned adjacent the track and extending the entire width of the track and substantially beyond one edge thereof. The grouser is so designed as to materially increase the area in engagement with the ground, thus increasing the flotation, and is also designed so as to substantially increase the traction provided by the tracks.

It is a further object of the invention to provide a grouser which may be easily manufactured from standard material, and which may be readily attached and detached from the track of the vehicle.

Another object and advantage of the present invention resides in the fact that the performance, maneuverability and adaptability of an existing vehicle provided with the usual type tracks can be materially increased by the simple expedient of attaching thereto a plurality of extended grousers constructed according to my invention. Thus, a standard track may be readily adapted for operation over difficult and extremely soft terrain, yet can also be used for normal operations upon paved roads and the like.

Other objects and advantages of the present invention will be made more apparent as this description proceeds, particularly when considered in connection with the accompanying drawings, in which.

Figure 1:
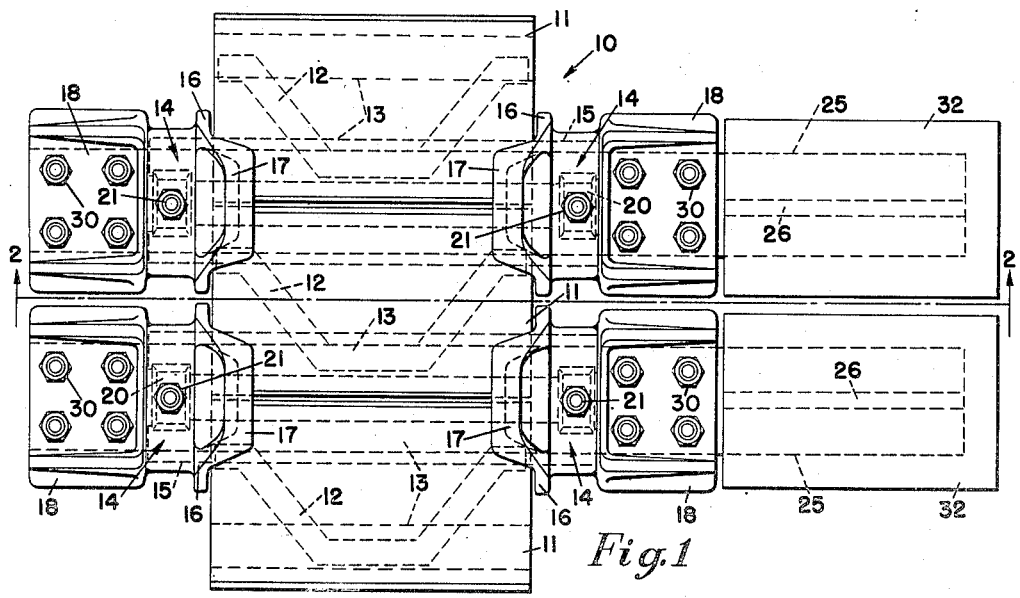
Figure 1 is a top plan view of a portion of a track having attached thereto grousers constructed in accordance with the present invention.
Figure 2:
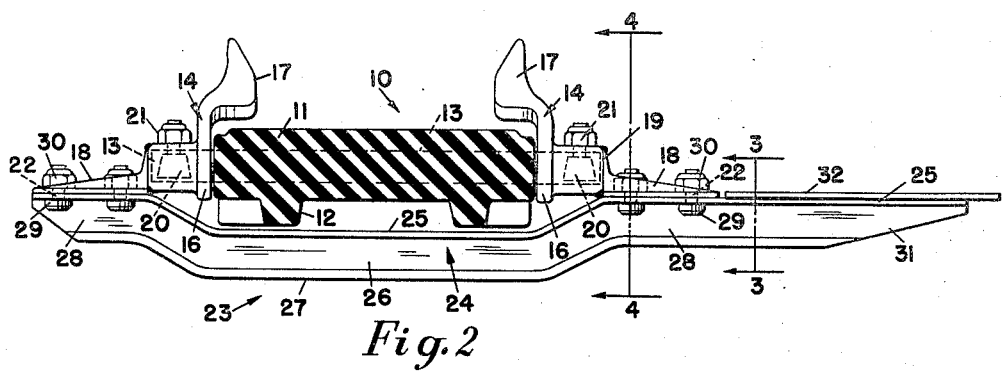
Figure 2 is a cross section taken substantially on the plane indicated by the line 2—2 of Figure 1.

Referring now to Figures 1 to 4 inclusive of the drawings, the reference character 10 indicates generally a track for a track laying vehicle. The track 10 comprises a plurality of spaced track blocks 11 constructed of steel or rubber and provided with chevron shaped cleats 12 on their lower surfaces. Each block is provided with a pair of transversely extending pins 13 extending outwardly from the ends of the blocks. A plurality of end connectors 14 are provided for interconnecting adjacent track blocks 11. Each end connector 14 has two apertures 15 for receiving the ends of the pins 13. Each connector overlaps the joint between adjacent track blocks and engages one pin of each track block, thus interconnecting the two blocks.

Each end connector 14 has a guide body 16, a guide 17 extending therefrom and preferably formed integrally therewith, and a flotation plate 18 extending transversely of the track. The flotation plate 18 is welded to the guide body 16, but if desired may be formed integrally therewith. The connectors are employed at each edge of the track, and engage the drive sprocket, the idler sprocket and the bogie wheels, and maintain the track properly aligned upon these wheels.

Extending from the outer surface of the guide body 16 is a generally U-shaped flange 19 adapted to embrace the ends of the pins 13. A wedge 20 is tightened between the pins 13 by means of a nut 21, thus locking the end connector to the pin.

The structure thus far described is known in the art.

For the purpose of the present invention the flotation plate 18 of each end connector is provided with a plurality of apertures 22.

Figure 3:
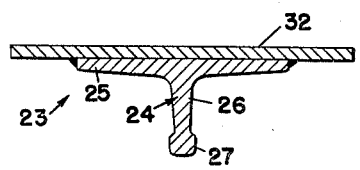
Figure 3 is a cross section taken substantially on the plane indicated by the line 3—3 of Figure 2.
Figure 4:
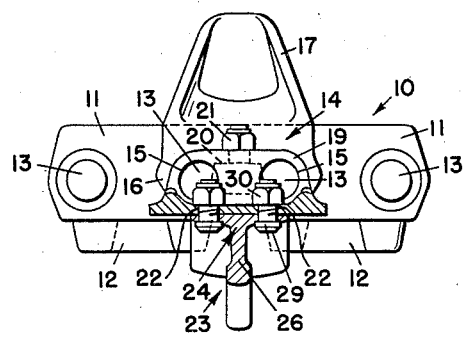
Figure 4 is a cross section taken substantially on the plane indicated by the line 4—4 of Figure 2.

The grouser 23 forming the present invention comprises a ground engaging body member 24, substantially T-shaped in cross section as best seen in Figure 3, and having a horizontal base 25 and a vertical web 26 extending from the central portion of a base and substantially at right angles thereto. The outer end of the web 26 is enlarged as at 27, to act as wearing surface. The enlarged end 27 is preferably hardened to enhance its wearing qualities.

It will be noted that the grouser 23 extends transversely of the track the entire width thereof, and has spaced portions 28 in engagement with the lower surfaces of the flotation plates 18 of the end connectors 14. A plurality of studs 29 are carried by the base 25 of the grouser, being welded thereto, and extend through the apertures 22 provided in the flotation plates 18 of the end connectors. Nuts 30 suitably engage the studs 29 and bolt the grouser to the end connectors. Thus it will be seen that each pair of transversely aligned and connectors 14 has secured thereto a grouser 23.

The spaced portions 28 of the ground engaging body member 24 of the grouser are bent upwardly to improve the steering of the vehicle and to reduce scuff on the grouser during steering. Sufficient clearance is provided between the depressed center portion of the grouser and the bottom of the adjacent track blocks to permit the necessary relative angular movement between adjacent track blocks when the latter are carried around the sprocket wheel or the idler wheel.

One end of the ground engaging member 24 of the grouser terminates adjacent the outer end of the adjacent end connector 14, while the opposite end extends substantially beyond its adjacent end connector. The extended end portion 31 of the grouser is located at the outboard side of the vehicle track so that it does not interfere with other parts of the vehicle.

Secured to the upper surface of the extended end portion 31 of the body member of the grouser is a relatively large flotation plate 32. The plate 32 may be integrally formed with the body member 24 of the grouser, but for ease of manufacture and economy it is formed separately and secured thereto by welding. The flotation plate 32 is relatively wide and provides substantial additional area to the track, thus increasing its flotation and lowering the ground pressure of the vehicle. The laterally extending web 26 of the grouser body member 24 functions as a traction cleat and greatly increases the traction of the vehicle.

The grouser may be readily attached or detached from the tracks 10 by means of the studs 29 and nuts 30, thus enabling the tracks to be used without the grouser for certain operations such as road travel. The tracks are preferably used with the grouser when the vehicle is operated over soft ground or any type of terrain requiring additional traction and flotation.

Although the grouser described above is shown attached to end connectors of the extended type having flotation plates 18, it will be readily understood that the grouser may also be attached to other types of end connectors, and furthermore can be used with tracks of different constructions.

Figure 5:
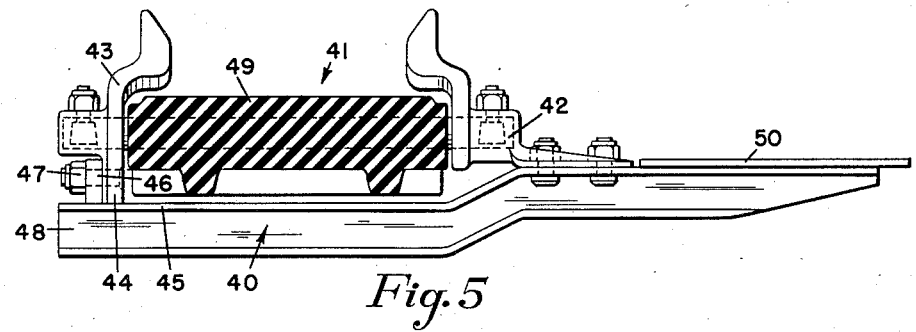
Figure 5 is a transverse cross section, similar to Figure 2, but illustrating a modification of the invention.
Figure 6:
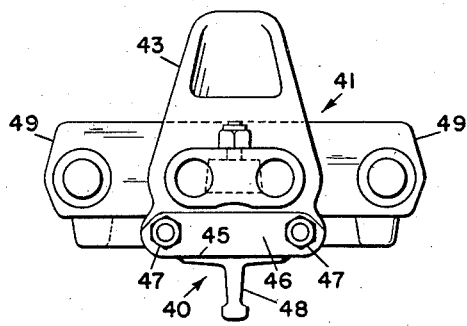
Figure 6 is an end elevation of the construction shown in Figure 5.

Referring now to Figures 5 and 6, I have illustrated a modification of the present invention in which the grouser 40 is designed for attachment to a track 41 having an extended end connector 42 at the outboard side thereof and an end connector 43 of smaller overall width at the inboard side of the track. On certain vehicles sufficient clearance may not be available between the track blocks and the vehicle for an extended end connector. In such cases an end connector such as shown at 43 may be used.

The end connector 43 has a downwardly extending flange 44, the end of which is adapted to engage the upper surface of the base 45 of the grouser, the latter being generally T-shaped in cross section similar to the construction shown in Figures 1 to 4 inclusive. Welded to the upper surface of the base 45 of the grouser is a bracket 46. The bracket 46 of the grouser and the flange 44 of the end connector are positioned adjacent each other and are provided with aligned apertures for receiving bolts 47 which pass through the grouser and the end connector. The end 48 of the grouser 40 terminates substantially at the edge of the end connector 43, thus providing a compact construction at the inboard side of the track and enabling the track and grouser to be used with a vehicle having limited clearance at that point.

As in the construction shown in Figures 1 to 4 inclusive, clearance is provided between the grouser 40 and the lower portion of the track blocks 49, and the grouser extends substantially beyond the outer end of the extended end connector 42 and carries thereon a flotation plate 50.

Although I have shown and described certain embodiments of the invention, it will be understood that I do not wish to be limited to the exact construction shown and described, but that various changes and modifications may be made without departing from the spirit and scope of my invention as defined in the appended claims.

What I claim is:

1. A grouser for a track of the type having a plurality of track blocks and a plurality of transversely aligned pairs of end connectors interconnecting the ends of adjacent track blocks, comprising a ground engaging member extending transversely the entire width of said track, said member overlying a pair of transversely aligned end connectors and extending across and spaced from the outer sides of the respective track blocks between said pair of end connectors, said member having a portion thereof extending substantially beyond one side of said track and beyond one of said end connectors to provide additional flotation, and means for detachably securing said member to said pair of end connectors.

2. A grouser for a track comprising a ground engaging member extending transversely of the track adjacent the outer side thereof, said member being substantially T-shaped in cross section with its base positioned adjacent the track and its web extending outwardly therefrom, said member having spaced portions positioned adjacent and secured to said track near the opposite edges thereof and a depressed central portion spaced from said track, and a flotation plate on said member extending outwardly beyond one edge of said track, said plate being wider than the base of said T-shaped member.

3. A grouser for a track of the type having a plurality of track blocks interconnected by a plurality of extended end connectors with flotation plates extending therefrom, comprising a ground engaging member extending transversely of the track adjacent its outer side and overlying the flotation plates of a pair of transversely aligned end connectors, said member having a substantially flat flange and an outwardly extending flange for traction, and means for detachably connecting said member to the flotation plates of said pair of transversely aligned end connectors.

4. A grouser for a track of the type having a plurality of track blocks and a plurality of end connectors connecting the ends of adjacent track blocks, comprising a ground engaging member extending transversely of the track adjacent its outer side and overlying a pair of transversely aligned end connectors, means for connecting said member to said pair of end connectors, and a flotation plate on said member extending outwardly beyond one edge of said track, said plate being wider than the base of said T-shaped member.

5. An extended grouser for a track of the type having a plurality of track blocks interconnected by a plurality of extended end connectors having flotation plates extending therefrom, comprising a ground engaging member extending transversely of the track adjacent its outer side and overlying the flotation plates of a pair of transversely aligned end connectors, said member having a substantially flat flange and an outwardly extending flange for traction, means connecting said member to the flotation plates of said pair of transversely aligned end connectors, and an auxiliary flotation plate on said member extending transversely beyond the outer edge of one of said end connector flotation plates.

THEODORE J. HOLLENKAMP.

References Cited in the file of this patent

UNITED STATES PATENTS

| Number | Name | Date |
|---|---|---|
| 1,503,611 | Springer | Aug. 5, 1924 |
| 1,923,099 | Knox | Aug. 22, 1933 |
| 2,334,196 | Hopkins | Nov. 16, 1943 |
| 2,391,907 | Knox | Jan. 1, 1946 |